US007562290B2

(12) United States Patent
Xavier et al.

(10) Patent No.: US 7,562,290 B2
(45) Date of Patent: Jul. 14, 2009

(54) CONTENT DOWNLOADING IN COMMUNICATION TERMINALS

(75) Inventors: Shakila A Xavier, Mundelein, IL (US); Douglas T. Michau, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 356 days.

(21) Appl. No.: 11/423,162

(22) Filed: Jun. 9, 2006

(65) Prior Publication Data

US 2007/0289021 A1    Dec. 13, 2007

(51) Int. Cl.
G06F 17/00 (2006.01)
(52) U.S. Cl. .......................... 715/229; 715/248; 705/54
(58) Field of Classification Search .................. 715/200, 715/229, 248, 273, 243; 705/54
See application file for complete search history.

(56) References Cited

U.S. PATENT DOCUMENTS

| 6,385,596 | B1 * | 5/2002 | Wiser et al. .................... 705/51 |
| 6,959,308 | B2 * | 10/2005 | Gramsamer et al. ......... 707/200 |
| 2002/0042780 | A1 * | 4/2002 | Yang ........................... 705/56 |
| 2003/0105573 | A1 | 6/2003 | Essafi et al. |
| 2003/0105739 | A1 * | 6/2003 | Essafi et al. .................... 707/1 |
| 2004/0249768 | A1 * | 12/2004 | Kontio et al. ................. 705/65 |
| 2005/0011947 | A1 * | 1/2005 | Reddy et al. ................. 235/380 |
| 2005/0044016 | A1 * | 2/2005 | Irwin et al. .................... 705/30 |

OTHER PUBLICATIONS

Blandford, Ann, et al, "Use of Multiple Digital Libraries: A Case Study", JCDL '01: Proceedings of the 1st ACM/IEEE-CS Joint Conference on Digital Libraries, Jan. 2001, pp. 179-188.*
Liu, Qiong, et al, "Digital Rights Management for Content Distribution", ACSW Frontiers '03: Proceedings of the Australian Information Security Workshop Conference on ACSW Frontiers 2003—vol. 21, Jan. 2003, pp. 1-10.*
Ann Blandford, Hanna Stelmaszewska, Nick Bryan-Kinns; "Use of Multiple Digital Libraries: A Case Study"; 10 Pages; Jan. 2001.
Qiong Liu, Reihaneh Safavi-Naini, Nicholas Paul Sheppard; "Digital Rights Management for Content Distribution"; 10 Pages; Jan. 2003.
OMA DRM Content Format; Approved Version 2.0—Mar. 3, 2006 (35 pages).
OAM DRM Specification; Approved Version 2.0—Mar. 3, 2006 (142 pages).

* cited by examiner

Primary Examiner—Laurie Ries
(74) Attorney, Agent, or Firm—Roland K. Bowler, II

(57) ABSTRACT

A multimedia terminal (200) that receives a document descriptor file in response to a content download request, parses the document descriptor file for a reference to a specification file that controls the usage of the requested content, and thereafter the terminal obtains the specification file. The specification file enhances the user experience and/or allows content servers to exert more or less control over how hosted content is presented to the end user at the terminal.

16 Claims, 5 Drawing Sheets

DOWNLOAD DESCRIPTOR FILE

```
<media xmlns="http://www.openmobilealliance.org/xmlns/dd">
<type>image/gif</type>
<objectURI>http:/download.example.com/image.gif</objectURI>
<size>100</size>
<installNotifyURI>http:/download.example.com/image.gif?id=image</installNotifyURI>
<specificationURI>http:/download.example.com/Specification.xml
</specificationURI>
</media>
```

*FIG. 5*

DOWNLOAD DESCRIPTOR XML FILE

```
<media xmlns="...">
<displayDD>true</displayDD>
<progressiveDownload>true</progressiveDownload>
<contentSave>Automatic</contentSave>
<postStatusTiming>ImmediatelyAfterDownload</postStatusTiming>
<noServerPostResponse>
    <retry>3</retry>
    <interval>1000</interval>
    <keepContentUponFailure>true</keepContentUponFailure>
    <nextScreen>browser</nextScreen>
</noServerPostResponse>
<resumeDownload>
    <dataTransmissionError>true</dataTransmissionError>
    <lossOfService>true</lossOfService>
    <incomingCall>ture</incomingCall>
    <userPause>false</userPause>
</resumeDownload>
<errorURI>http://download.example.com/error</errorURI>
</media>
```

*FIG. 6*

CONTENT DOWNLOADING IN COMMUNICATION TERMINALS

FIELD OF THE DISCLOSURE

The present disclosure relates generally to wireless communications, and more particularly to content downloads in wireless communication networks and mobile user terminals, for example, corresponding devices and methods.

BACKGROUND

The Open Mobile Alliance (OMA) specifications for over-the-air content download and Digital Rights Management (DRM) describe technology that is used to confirm delivery of various kinds of digital content downloaded to user terminals in wireless communication networks. The Generic Content Download Over-The-Air Specification Version 1.0 and Digital Rights Management Version 1.0 describe the generic content download procedure. The OMA specification however leaves undefined many user terminal implementation details.

FIG. 1 illustrates a typical prior art content download according to the current OMA specifications. At 101, a user 102 selects content to download, for example, video content, using a content locating and selection tool, for example, a browser 104. At 105, a server 106 sends a Document Descriptor (DD) file in response to the browser's request, and the DD file is processed by an OMA Download Manager 110. At 112, a dialog is shown to the user requesting confirmation to proceed with the download. At 114, when the user selects to proceed, a request is sent to the server for the content. At 116, the server sends the content along with an indication that the rights object is forthcoming. An OMA DRM component 117 then waits until the rights object is pushed to the mobile device at 118. The rights object is subsequently processed at 120 and saved at 122. Depending on a carrier configurable option, the content may be previewed before saving or saved without preview. The content can be saved either before or after the result of the download is posted to the server. When the DRM download is complete, the browser goes back to display the previous page at 124.

The various aspects, features and advantages of the disclosure will become more fully apparent to those having ordinary skill in the art upon careful consideration of the following Detailed Description thereof and the accompanying drawings described below. The drawings may have been simplified for clarity and are not necessarily drawn to scale.

BRIEF DESCRIPTION OF THE DRAWINGS

FIG. 5 is illustrates XML syntax for a Download Descriptor file.
FIG. 6 is illustrates XML syntax for a specification file.

DETAILED DESCRIPTION

Figure 1:
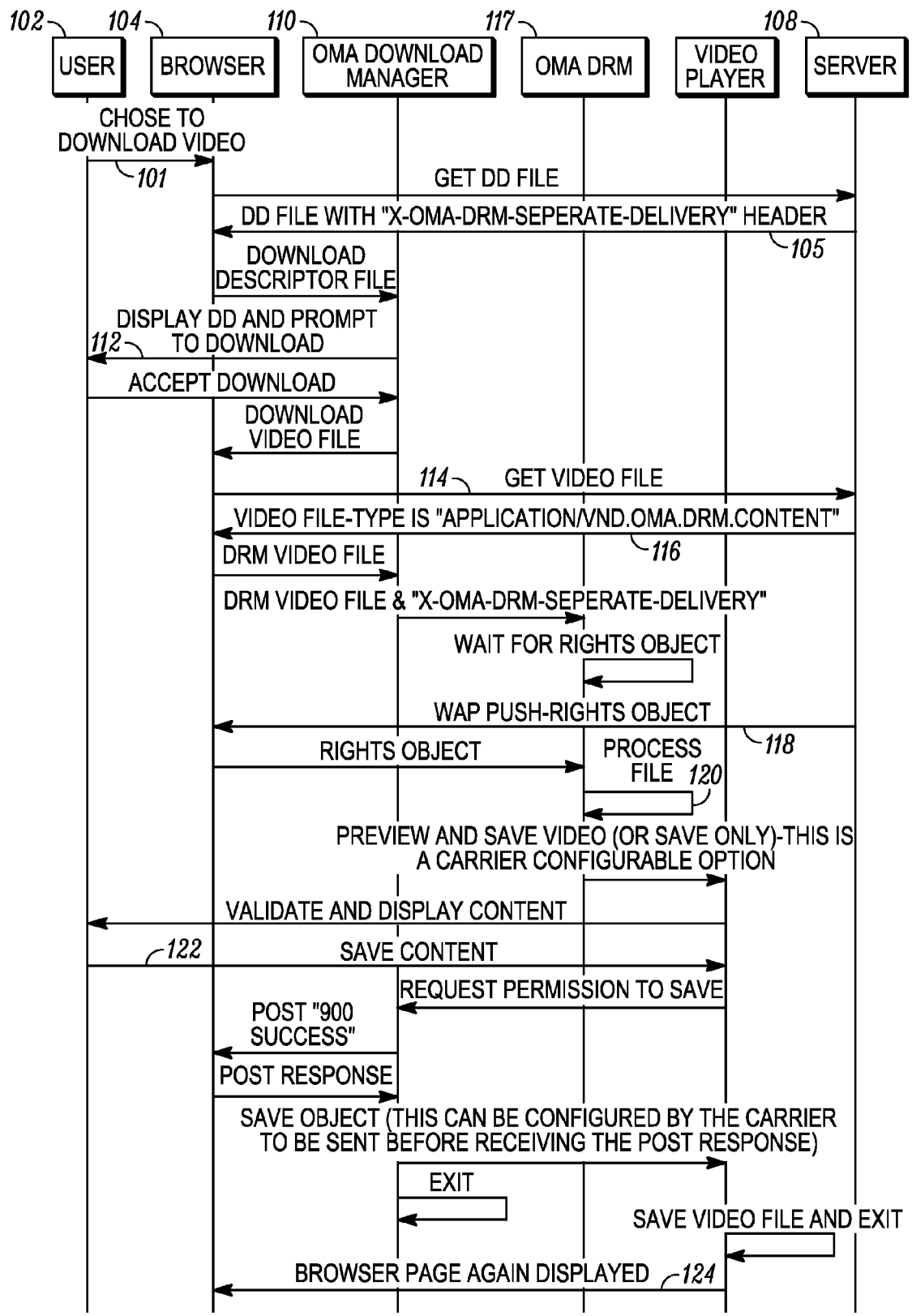
FIG. 1 is a prior art content download method.
Figure 2:
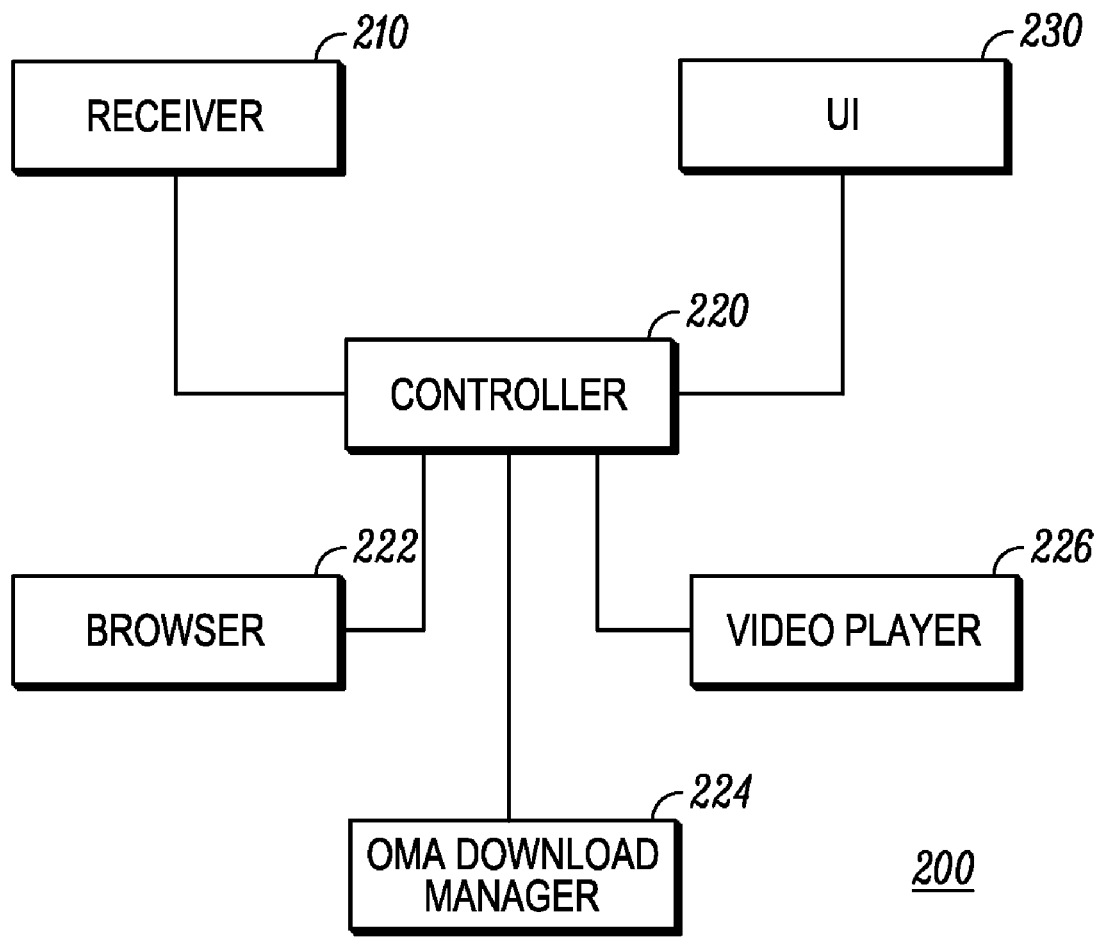
FIG. 2 illustrates a multimedia communication terminal.

In FIG. 2, a multimedia communication terminal 200 generally comprises a receiver 210, which may be part of a transceiver, and a controller 220 communicably coupled to the receiver. The controller is communicably coupled to memory, not illustrated but well known by those having ordinary skill in the art. The controller is also communicably coupled to a user interface 230, which may include user inputs and outputs, the particulars of which depend generally upon the type of multimedia terminal. Exemplary user interface inputs include a keyboard/pad, microphone or other voice command input device, data input ports, among other inputs. Exemplary user outputs include a visual display and an audio output, among other outputs.

In FIG. 2, the controller 220 may control or integrate the operation or function of various entities on the device. The controller also runs applications. In FIG. 2, for example, the controller runs a browser application 222, and an OMA download manager 224. The controller also runs a multi-media content player application 226, for example an audio and/or video player. The specific functions of these applications and other functions of the controller are discussed more fully below.

The multi-media terminal may be embodied as a wire-line or wireless communication terminal. The multimedia terminal may be a fixed base terminal or a mobile terminal. In one embodiment, for example, the terminal is a cellular communications handset having multimedia capability, wherein multi-media content is received by a radio receiver over a cellular communication link, or over a wide or local area network link, or over a digital video or audio broadcast link, or over some other communication link.

Figure 3:
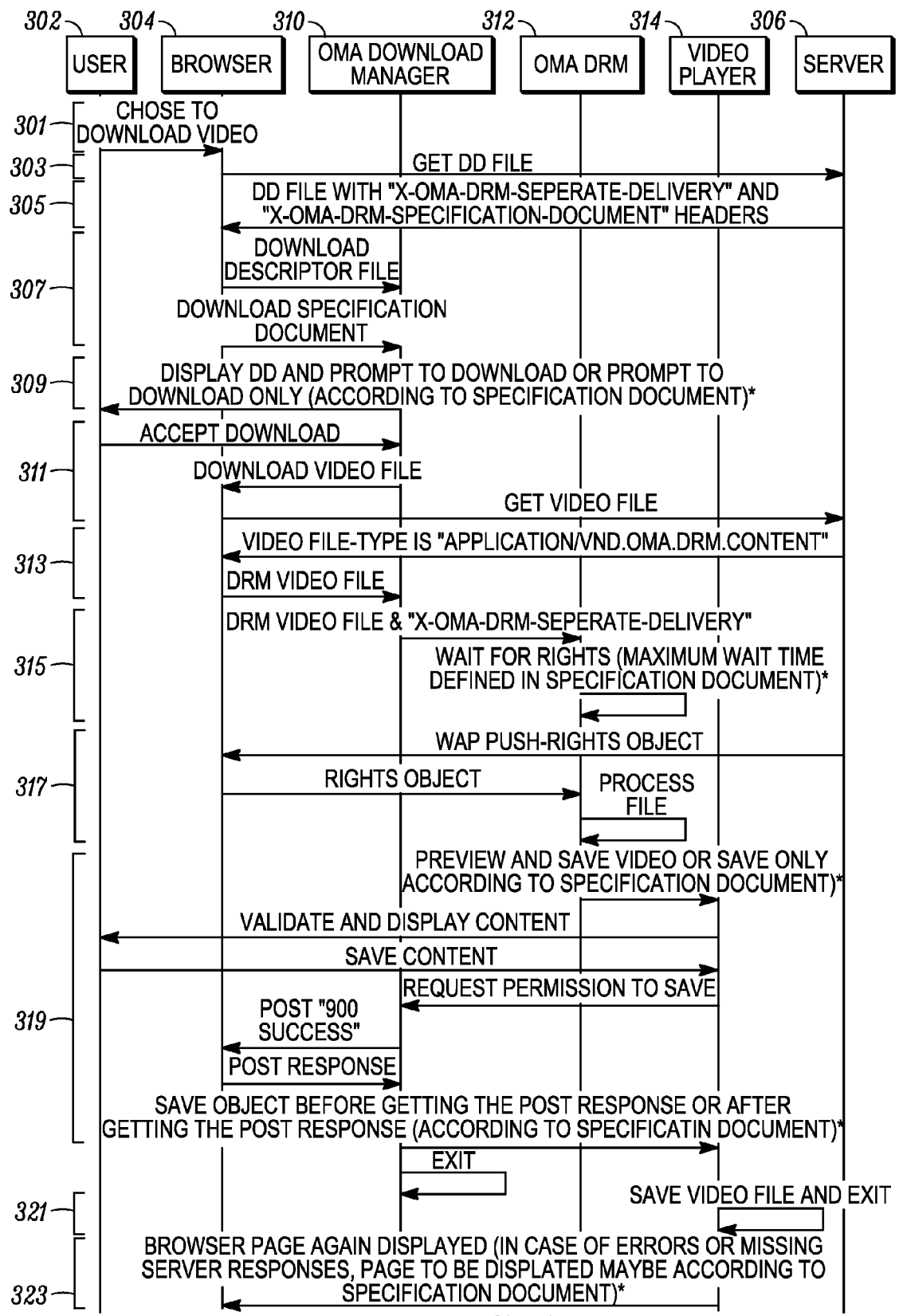
FIG. 3 is a disclosed content download method.

In FIG. 3, at 301, a user 302 selects content to download from a terminal using a content locating and selection tool, for example, a browser 304 or other application running on the terminal. At 305, a server 306 sends information regarding a specification file or document to be used by the terminal in response to the browser's request.

The specification file enhances the user experience and/or allows content servers to exert more or less control over how hosted content is presented to the end user at the terminal. The specification file may control various aspects of the content requested by the user, for example, how the content may be used, default settings and configurations among other aspects thereof as discussed more fully below. In one embodiment, the specification file controls how the requested content is used by the requester. The specification file may also specify how the requested content is presented to the user, for example, when and how the content is displayed. In another embodiment, the specification file specifies whether the requested content can be previewed without a rights object. The specification file may also specify a rights object acquisition procedure. In another embodiment, the specification file specifies whether to post the results of a content download attempt to the server. Also, if there is no response from the server at any point during the download of the content and/or rights object, the specification file could re-direct the user to a different URI after an unsuccessful download attempt. The specification file may be specified by a network carrier or other service provider or by a content provider.

In one embodiment, the specification document is referenced in a Document Descriptor file. The Document Descriptor file may also provide details like the universal resource locator (URL) or universal resource indicator (URI) of content, content size, post URL, etc. as is known generally. In another embodiment, the Document Descriptor file may indicate that a rights object will be delivered by separate delivery. In one embodiment, the specification file controls whether the terminal displays the content of the Document Descriptor file to the user.

In embodiments where the specification file is referenced in a document descriptor file, a parsing element parses the document descriptor file for a reference to the specification file. The parsing is performed upon receipt of the document descriptor file by the receiver. In the process 400 of FIG. 4, at 410, the terminal parses the document descriptor file for a reference to the specification file. The parsing may be performed by an application running on the controller.

FIG. 5 illustrates exemplary XML syntax for a Download Descriptor file. The specification URI attribute in the Download Descriptor file points to the location of the specification file pertaining to this download. FIG. 6 illustrates exemplary XML syntax for a specification file. The specification file could mandate specific behavior for several different scenarios as shown in FIG 6. For example, it mandates that the Download Descriptor file be displayed to the user while keeping the download progressive along with automatic saving following posting of the result of the download. In embodiments where there is no response from the server, the terminal should retry posting the result three times at an interval of 1000 seconds between tries and the terminal should keep the content in case of failure. If the terminal receives interrupts related to data transmission, loss of service, and incoming calls (but not in the case of user pause), the terminal will resume the download. Also specified is the URI that the user be re-directed to in case of any error condition that could occur at anytime during the download.

Figure 4:
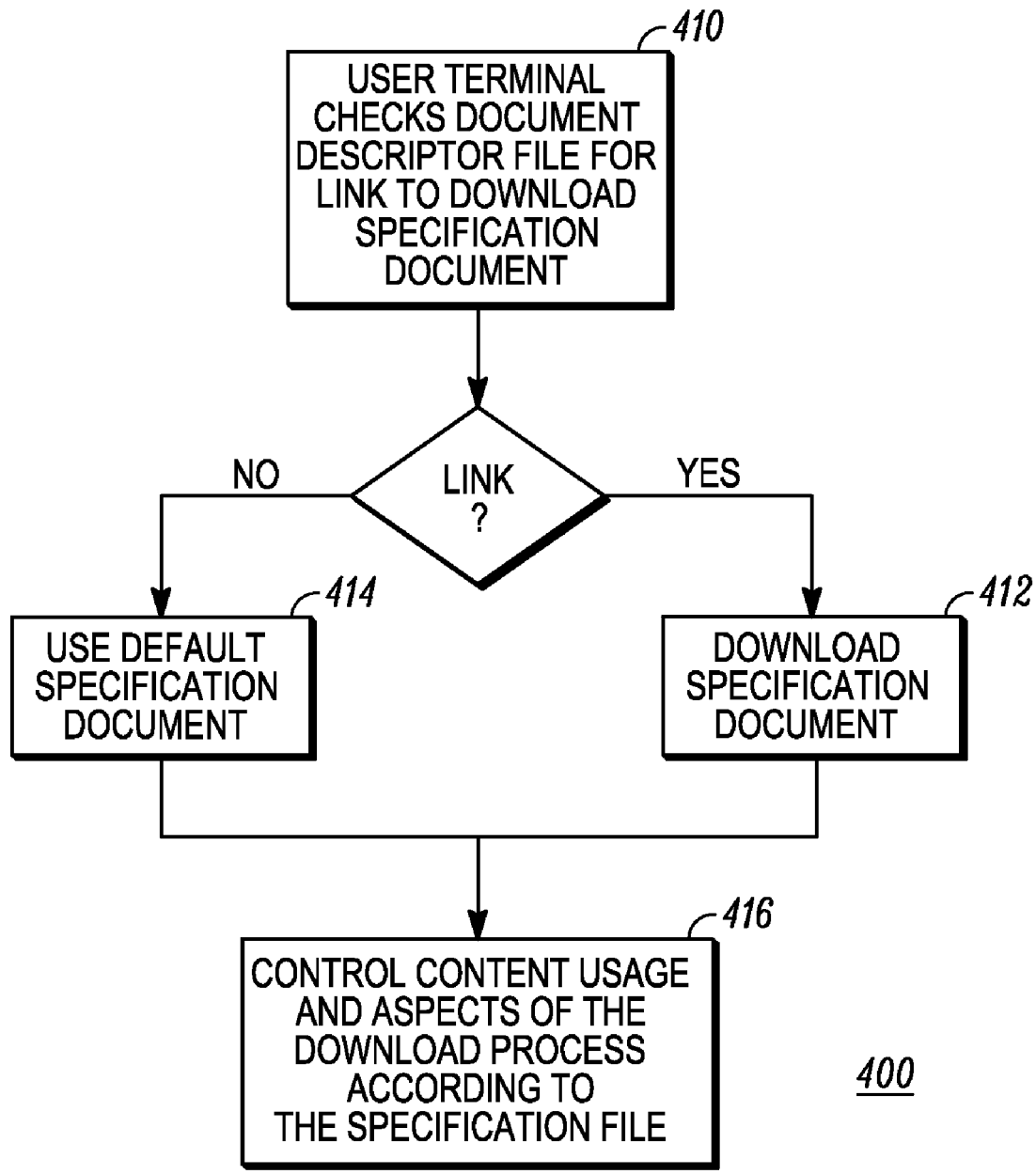
FIG. 4 illustrates a process flow diagram.

FIG. 4, at 412, if there is a reference to the specification file, the terminal obtains the specification file referenced in the document descriptor file. In one embodiment, the specification file is obtained from a location on the terminal, for example, from a memory location. In another embodiment, the specification file is obtained from a source beyond the terminal. In FIG. 3, at 307, the browser obtains the download specification document and forwards it to a download manager, for example, to an OMA Download Manager Application or similar application, which processes the information. In FIG. 4, at 414, the Document Descriptor file is devoid of a reference to a specification file, a default specification file may be used. Alternatively, Document Descriptor file may reference a default specification file, which is used. In FIG. 4, at 416, the terminal controls usage of the downloaded content and other aspects of the download process based on the specification file.

In FIG. 3, at 309, the specification file specifies whether the Document Descriptor file is to be displayed on the terminal and prompts the user, for example, in a dialog block asking for confirmation on whether to proceed with the download of the requested content. Alternatively, at 309, the specification file prompts the user to download the requested content without displaying the Document Descriptor file. In FIG. 3, at 312, when the user selects to proceed with the content download, the OMA Download Manager 310 forwards the content download request to the browser 304, which sends the request to the server 306. At 313, the browser 304 downloads the video file from the server 306 and sends the video file to the OMA Download Manager 310.

In an alternative embodiment, in FIG. 3 at 315, the server 306 sends the content along with an indication that the rights object is to arrive shortly. At 315, an OMA DRM component 312 waits for the rights object to be pushed to the mobile device for a specified wait time, for example, a maximum wait time, which is indicated in the specification document. At 317, the server 306 pushes the rights object to the browser 304 and the browser forwards the rights object to the DRM component 312 for processing on the terminal. In one embodiment, the rights object is processed only if it is received within the specified wait time. In embodiments where there are no digital rights associated with the content, the device may or may not allow the user to preview the content, depending on what is specified by the specification file.

In FIG. 3, at 319, the downloaded content may be previewed by the user and saved. Alternatively, the content is saved without being previewed. Whether the content is previewed is dependent on whether the specification file permits previewing. In embodiments where the user explicitly chooses to save the content, the request is sent to a video player application 314 on the terminal. This can be done either before or after the result of the download is posted to the server, according to the specification document. At 321, the video player application 314 performs the actual saving of content to a location on the terminal. At 323, the DRM download is now complete and the browser 304 goes back to display the browser page specified by the specification document.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a multimedia terminal, the method comprising:
   receiving a document descriptor file in response to a content download request;
   parsing the document descriptor file for a reference to a specification file, the specification file controlling use of the requested content, the specification file specifying how the requested content is presented to the user;
   obtaining the specification file based on results of the parsing;
   downloading the content requested; and
   presenting the content to the user as specified in the specification file.

2. The method of claim 1, parsing the document descriptor file for the reference to the specification file includes parsing for a link to the specification file.

3. The method of claim 1, the specification file specifying whether the requested content can be previewed without a rights object, downloading the content requested without a rights object, controlling content preview based on the specification file.

4. The method of claim 1, the specification file specifying a rights object acquisition procedure, acquiring a rights object for the requested content based on the rights object acquisition procedure of the specification file.

5. The method of claim 1, the specification file specifying whether to post on a server the results of an attempt to download the content to the multimedia terminal.

6. The method of claim 1, obtaining a default specification file absent a reference to a specification file in the document descriptor.

7. A multimedia communication terminal, comprising:
   a receiver;
   a controller communicably coupled to the receiver, the controller including document descriptor file parsing functionality,
   the document descriptor file parsing functionality parsing a document descriptor file for a reference to a specification file upon receipt of the document descriptor file by the receiver and before receipt of a rights object for content with which the specification file is associated.

8. The multimedia communication terminal of claim 7,
the receiver receiving the document descriptor file in response to a content download request,
the specification file controlling use of requested content.

9. The multimedia communication terminal of claim 7 is a mobile wireless communication terminal.

10. The multimedia communication terminal of claim 7, the reference to the specification file is a link, the document descriptor file parsing functionality parsing the document descriptor file for a link to the specification file.

11. The multimedia communication terminal of claim 7, the controller including specification file retrieving functionality, the specification file retrieving functionality obtaining the specification file based on the results of parsing.

12. The multimedia communication terminal of claim 11, a plurality of different specification files stored on the multimedia communication terminal, the specification file retrieving functionality obtaining the specification based on the results of parsing.

13. The multimedia communication terminal of claim 12, the specification file specifying a rights object acquisition procedure for content associated with the document descriptor file, the controller including a rights object acquisition module for acquiring a rights object pursuant to the acquisition procedure specified by the specification file.

14. The multimedia communication terminal of claim 7, the specification file referenced in the document descriptor file is stored on the multimedia communication terminal.

15. The multimedia communication terminal of claim 14, the specification file specifying how content associated with the document descriptor file is presented.

16. The multimedia communication terminal of claim 14, the specification file specifying whether content associated with the document descriptor file can be previewed without a rights object.

* * * * *